Feb. 4, 1930. A. LEUTWYLER 1,745,374
DEVICE FOR INTRODUCING PISTONS FITTED WITH PISTON RINGS INTO CYLINDERS
Filed Nov. 1, 1928

INVENTOR:
Adolf Leutwyler,
By Henry Orth Jr
atty

Patented Feb. 4, 1930

1,745,374

UNITED STATES PATENT OFFICE

ADOLF LEUTWYLER, OF OBERWIL, NEAR ZUG, SWITZERLAND

DEVICE FOR INTRODUCING PISTONS FITTED WITH PISTON RINGS INTO CYLINDERS

Application filed November 1, 1928, Serial No. 316,488, and in Switzerland June 12, 1928.

Pistons, for instance, of internal combustion engines, are generally provided with springy piston rings for tightening purposes. When the piston is pulled out of the cylinder the rings increase their diameter by their resiliency. It is then difficult to insert the piston fitted with the piston rings again into the cylinder as for this purpose the rings must be compressed.

It is the object of the present invention to obviate the drawbacks inherent to the known devices of this type and to provide a device which can be utilized in the limited space present with modern block motors.

The device according to the present invention, which comprises two ring halves or stirrups connected at their one ends by a hinge joint and at their other ends by a screw contrivance, is characterized by the fact that the part of one ring half cooperating with the hinge bolt is formed as a hook in order to permit unhooking and thereby a separate removal of the ring halves.

This device permits to insert a piston even if the space is very limited as from the side pointing towards the operator and on which there is the screw contrivance the unhooking of the hinge joint may be carried out.

A constructional example of the subject matter of the invention is illustrated on the accompanying drawings, in which Fig. 1 is a side view.

Figure 1:
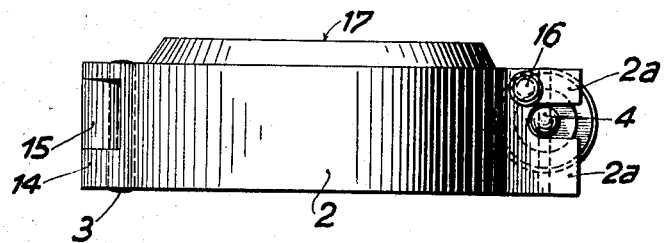
Figure 2:
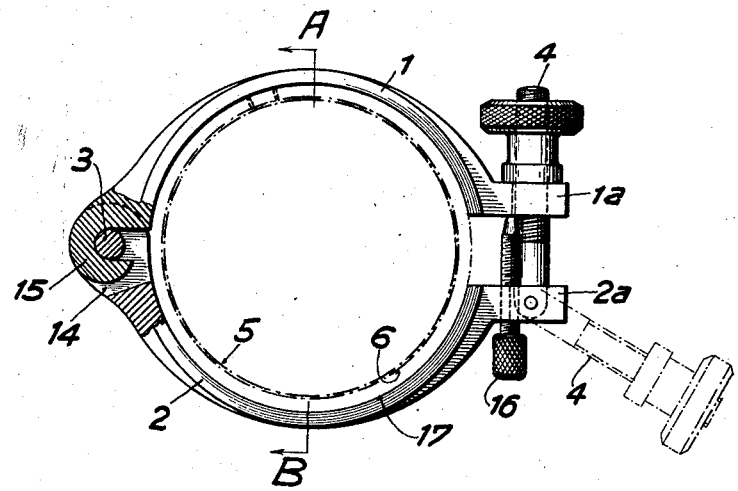
Fig. 2 is a plan view.
Figure 3:
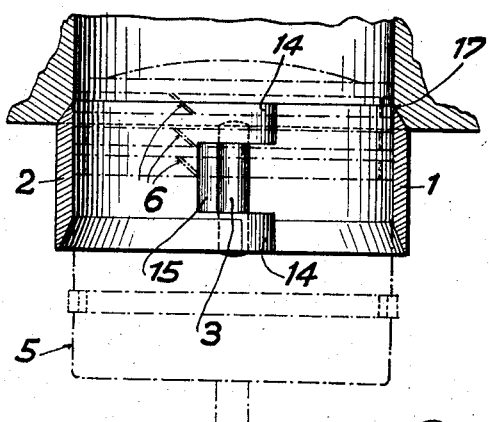
Fig. 3 is a section along line A—B in Fig. 2.

1 and 2 are the stirrups or ring-halves of the clamp, connected at their one ends by a hinge joint 3 and at their other ends by an adjustable locking screw or swing bolt 4, whereby the inside diameter of the clamp can be varied within certain limits. The bolt 3 of the hinge joint is completely surrounded by the ear 14 of the stirrup 1, however, the ear 15 of the stirrup 2 is open at its inner side and shaped as a hook (Fig. 2), so that the stirrup 2 may be unhooked from the stirrup 1 after unscrewing the screw 4 and carrying out a small angular adjustment relatively to the stirrup 1 whereupon the stirrup 2 may be removed in a radial direction. Thus it is not necessary to open the stirrups 1 and 2 so far that the piston can pass between the ears $1^a$ and $2^a$ of the stirrups, for which opening there is not sufficient space in most cases.

It may occur that with the rings 6 compressed the device is clamped on the circumference of the piston 5 by the wedge-action occurring when the device is pressed with its bevelled edge 17 into the cylinder. This would render difficult if not prevent the piston 5 to be pushed through the clamp. In order to prevent this an abutment screw 16 is arranged in the ear $2^a$ of the stirrup 2 which is axially adjustable and abuts with its inner end against the ear $1^a$ of the stirrup 1. By this means the closing of the two stirrups 1 and 2 may be adjusted to a determined inside diameter of the clamp, whereby a clamping of the latter on the piston 5 is prevented and the latter together with its rings 6 can easily be inserted into the cylinder.

I claim:

1. A device of the type described, comprising in combination two semi-circular ring shaped members a detachable hinge joint for pivotally connecting together the one ends of said members a swing bolt for connecting to each other the other ends of said members, and a set screw screwed into the end of one of said members and abutting against the end of the other of said members for determining the inside diameter of said members closed by said swinging bolt.

2. A device of the type described, comprising in combination, two semi-circular ring shaped members, a detachable hinge joint for pivotally connecting together the one ends of said members and comprising a hinge pin, bearing means provided at one end of one of said members and completely enclosing said hinge pin, and a hooked shaped part at one end of the other of said member and hooked in said hinge pin, a swing bolt for connecting to each other the other ends of said members, and adjustable abutment means for determining the inside diameter of said members when closed by said swinging bolt.

In testimony whereof I have signed my name to this specification.

ADOLF LEUTWYLER.